J. F. COLLINS.
AUTOMOBILE STARTING DEVICE.
APPLICATION FILED DEC. 14, 1916.
1,279,516.
Patented Sept. 24, 1918.
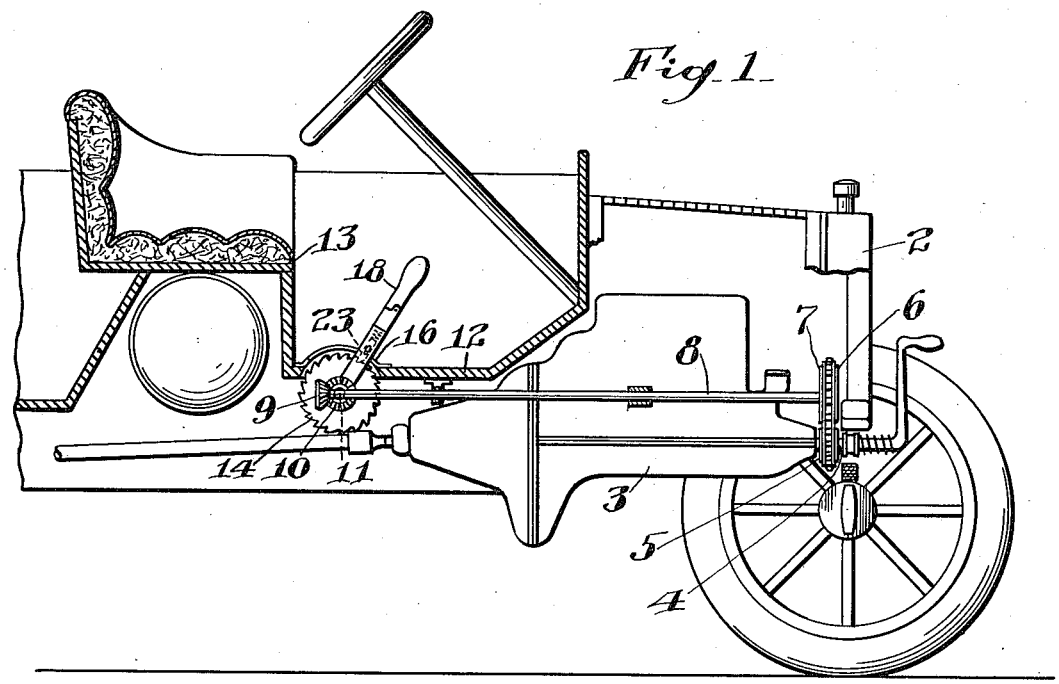
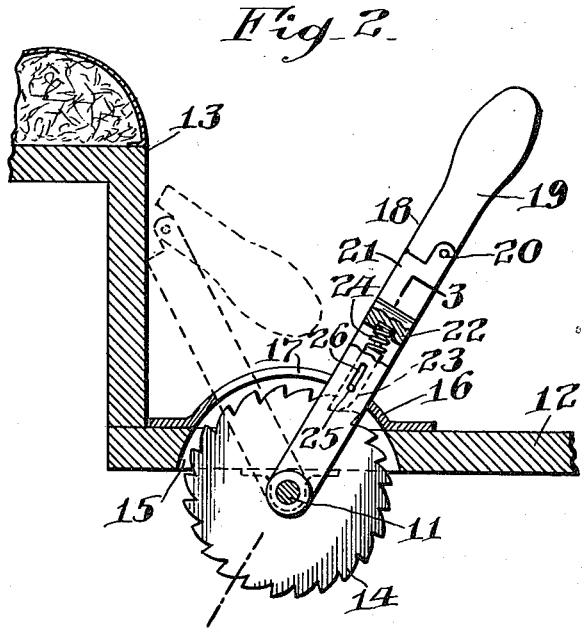
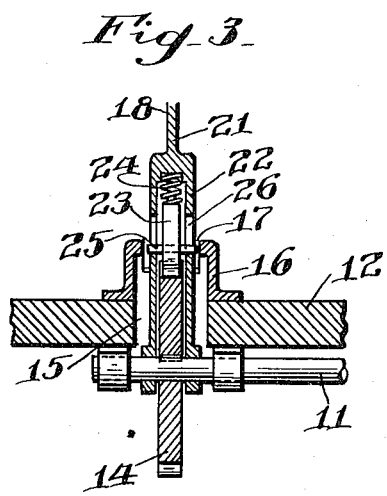
Witnesses
H. W. Burton
Inventor
John F. Collins,
By W. W. Williamson
Attorney

UNITED STATES PATENT OFFICE.

JOHN F. COLLINS, OF PHILADELPHIA, PENNSYLVANIA.

AUTOMOBILE STARTING DEVICE.

1,279,516.                        Specification of Letters Patent.     Patented Sept. 24, 1918.

Application filed December 14, 1916.   Serial No. 136,936.

*To all whom it may concern:*

Be it known that I, JOHN F. COLLINS, a citizen of the United States, residing at Philadelphia, in the county of Philadelphia and State of Pennsylvania, have invented new and useful Improvements in Automobile Starting Devices, of which the following is a specification.

My invention relates to new and useful improvements in automobile starting device, and has for its object to provide an exceedingly simple and effective device of this character which may be manually operated from the driver's seat, whereby the engine may be cranked or given its initial starting motion.

A further object of the invention is to provide a starting device for automobiles in which the power of the operator is transferred to the crank shaft of the engine, thereby eliminating the use of electricity, springs or other mechanical power, said device consisting of a sprocket wheel mounted upon the crank shaft in such manner as to cause said crank shaft to be revolved with the sprocket wheel, but permit said crank shaft to revolve within said sprocket wheel when the engine is operated and the starting device is not in use, a chain running over said sprocket wheel and another similar wheel of greater diameter, the latter being mounted upon a shaft to which is secured a beveled gear meshing with another bevel gear mounted upon a shaft situated at right angles to the first named shaft, said last named shaft having a ratchet wheel secured thereto and adapted to be actuated by a suitable lever.

A further object of the invention is to provide an automobile starting device having as a part thereof a ratchet wheel with which engages a spring actuated ratchet or dog carried by the operating lever, said operating lever being formed of two parts hinged together, whereby said lever may be collapsed so that the handle portion thereof may be dropped down out of the way so as not to interfere with the operator.

With these ends in view, my invention consists in the details of construction and combination of elements hereinafter set forth and then specifically designated by the claim.

In order that those skilled in the art to which this invention appertains, may understand how to make and use the same, I will describe its construction in detail, referring by numeral to the accompanying drawing forming a part of this application, in which—

Figure 1, is a sectional view of a portion of an automobile showing my starting device applied thereto.

Fig. 2, is an enlarged vertical sectional view of the operating lever showing its relation to the automobile and adjacent parts of the starting device, and showing in dotted lines the manner in which said lever may be collapsed and its ordinary position while the automobile is in use; and Fig. 3, is a section at the line 3—3 of Fig. 2.

In carrying out my invention as here embodied 2 represents an automobile provided with an engine 3 having a crank shaft 4. On some suitable portion of this crank shaft is mounted a sprocket wheel over which runs a chain 6, the latter also running over another sprocket wheel 7 preferably of greater diameter than the sprocket wheel 5, and this sprocket wheel 7 is mounted upon one end of the shaft 8 on the opposite end of which is mounted a bevel gear 9 which meshes with a bevel gear 10 mounted upon a shaft 11 arranged at right angles to the shaft 8, and situated beneath the floor 12 of the automobile just forward of the operator's seat 13. On the shaft 11 is also mounted a ratchet wheel 14 which projects through an opening 15 in the floor 12 of the automobile and extends some distance above said floor. This portion of the ratchet wheel which extends above the floor of the automobile is protected and covered by a casing 16 having a slot 17 therein.

18 denotes the operating lever comprising a handle 19 hinged at 20 to the body 21, said body having a pair of arms 22 projecting therefrom adapted to straddle the ratchet wheel 14 and journaled upon the shaft 11.

Within the body of the lever and projecting between the arms 22 is mounted a ratchet or dog 23 normally forced outward by a spring 24, but retained in position, and its movements regulated by a pin 25 passing through the ratchet or dog 23 and slidably mounted in slots 26 in the arms 22 of the operating lever.

One face of this ratchet or dog is beveled in the same manner as one face of the teeth of the ratchet wheel, so that any reverse movement of said ratchet wheel will not be interfered with by the ratchet and this construction also permits the operating lever to be moved forward when positioning the same prior to starting the engine.

The parts of the lever are so hinged that when the handle portion is raised, one end thereof will rest upon one end of the body portion, permitting said lever to be used without the necessity of latches or triggers which often break or become disarranged. The operating lever projects through the slot 17 in the cover or casing 16 and works therein when the starting device is in use, and the length of said slot regulates the movements of the operating lever.

In practice when it is desired to start the engine of the automobile, the operating lever is placed in the position shown in Fig. 1, at which time the ratchet or dog will engage one face of the teeth of the ratchet wheel 14. Then by giving the operating lever a short, quick pull, motion will be transmitted through the ratchet wheel 14, the shaft 11, the bevel gears 10 and 9, the shaft 8 and the sprocket wheels and chain to the crank shaft of the engine, thereby giving said engine the necessary initial movement to start the same as will be readily understood.

The sprocket wheel 5 is mounted upon the crank shaft in any suitable and well known manner that will cause said crank shaft to revolve with the sprocket wheel when said sprocket wheel is rotated in the proper direction, but will run loose upon the shaft when the engine is running or when the same backfires.

Of course I do not wish to be limited to the exact details of construction as herein shown, as these may be varied within the limits of the appended claim without departing from the spirit of my invention.

Having thus fully described by invention, what I claim as new and useful, is—

A starting device for engines of automobiles comprising a shaft, means for transmitting motion from said shaft to the crank shaft of the engine, another shaft, means for transmitting motion from the last named shaft to said first named shaft, a ratchet wheel on said last named shaft, an operating lever journaled on said last named shaft, said operating lever comprising a body and a handle portion hinged thereto, a portion of said body being bifurcated to form arms, one of which is situated on each side of the ratchet wheel, and a spring actuated ratchet carried by the body and adapted to engage the ratchet wheel whereby motion is transmitted from the operating lever to said ratchet wheel In testimony whereof, I have hereunto affixed my signature in the presence of two subscribing witnesses.

JOHN F. COLLINS.

Witnesses:
T. FOSTER THOMAS,
LEONARD W. BELZ.